United States Patent Office 3,658,881
Patented Apr. 25, 1972

3,658,881
2,6-DIHYDROXY - 3 - BROMO-5-HALO-4-ALKOXY-BENZOIC ACIDS AND ALKYL ESTERS THEREOF
Shoji Maruyama, Sagamihara-shi, and Yoshikazu Kaneko, Tokyo, Japan, assignors to Kabushiki Kaisha Ricoh, Tokyo, Japan
No Drawing. Filed Mar. 28, 1969, Ser. No. 811,606
Claims priority, application Japan, Apr. 2, 1968, 43/21,689
Int. Cl. C07c 65/04, 69/88
U.S. Cl. 260—473         4 Claims

ABSTRACT OF THE DISCLOSURE 2,6-dihydroxy-3,5-dihalogen-4-alkoxybenzoic acids or alkyl esters thereof containing at least one bromine atom are disclosed and illustratively, the methyl ester of 2,6-dihydrory-3,5-dibromo-4-methoxybenzoic acid, 2,6-dihydroxy-3-bromo-4-methoxy-5-chloro-benzoic acid and 2,6-dihydroxy-3,5-dibromo-4-ethoxybenzoic acid. These compounds are useful as couplers for diazo-type thermal-developable sensitive materials.

BACKGROUND OF THE INVENTION

(A) Field of the invention

The present invention relates to a process for preparing derivatives of benzoic acid having a general formula:

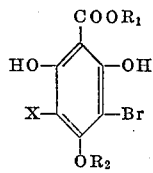

wherein $R_1$ is hydrogen or lower alkyl radical of from 1 to 4 carbon atoms, $R_2$ is lower alkyl radical of from 1 to 4 carbon atoms and X is bromine or chlorine.

Said derivatives are suited for a coupler of diazo-type thermal-developable sensitive materials.

(B) Description of the prior art

Conventional couplers of diazo-type sensitive material, which are contained together with diazo-compound and alkaline-producing compound in the sensitive material, react with diazo-compound even at a room temperature, that is to say, precoupling occurs. It is understood that a phenomenon of fogging is caused by precoupling.

It is an object of this invention to overcome the aforesaid disadvantage of prior art couplers.

SUMMARY OF THE INVENTION

The present invention relates to derivatives of benzoic acid having a following general formula and a process for preparing thereof.

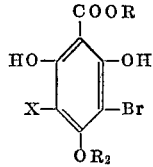

wherein $R_1$ is hydrogen or lower alkyl radical of from 1 to 4 carbon atoms, $R_2$ is lower alkyl radical of from 1 to 4 carbon atoms and X is bromine and chlorine.

Said derivatives of benzoic acid are white crystalline novel compounds which have not been described in literatures. We have found that said compounds are useful for couplers of the thermal-developable sensitive materials and may be obtained by halogenating (brominating, or brominating and simultaneously chlorinating) 2,6-dihydroxy-4-alkoxybenzoic acid or lower alkyl ester thereof in a suitable solvent.

An example of the present invention is as follows:

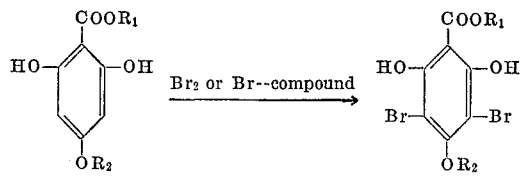

wherein $R_1$ and $R_2$ are as above defined.

The present invention is based on that halogen may be easily introduced in 3- and 5-position of 2,6-dihydroxy-4-alkoxy benzoic acid or lower alkyl ester thereof and the product may be obtained in high yield.

2,6-dihydroxy-4-alkoxy benzoic acid or lower alkylester thereof, which is used as a starting product, may be prepared by the reaction of phloroglucinolcarboxylic acid with diazo-methane in ether or by reacting phloroglucin alkyl ether with alkali in an autoclave. These reactions are well known. Moreover, although chlorination of the starting product may be carried out in conventional method, 2,6-dihydroxy - 3,5 - dichloro-4-methoxybenzoic acid thus obtained has not satisfactory property for the coupler of diazo-type sensitive materials. On the contrary, the product of the present invention, which has the aforesaid general formula, is superior for the coupler of diazo-type sensitive materials, and novel substance.

According to the present invention, brominating agent is preferably bromine or sulfuryl bromide and chlorinating agent is preferably chlorine or sulfuryl chloride. Solvents for reaction are preferably water, ether, chloroform, acetic acid, benzene and alcohols. Acetic acid is suitable for solvent, when said derivatives, $R_1$ of which is hydrogen, is prepared and chloroform is suitable, when said $R_1$ is a lower alkyl radical. The reaction may be accelerated by heating or irradiating the reaction mixture, or applying catalysts for halogenation. As the action, however, proceeds fully at a room temperature and the high yield of the product may be achieved, the aforesaid procedures, which accelerate the reaction are not always required.

The advantage of the compound of the present invention is as follows:

As stated before, conventional couplers are contained together with diazo-compound and alkaline-producing compound in the sensitive material and consequently, the reaction between coupler and diazo-compound (i.e., precoupling) proceeds even at a room temperature, and said precoupling proceeds heavily at a high temperature and high humidity. This precoupling cannot be prevented in the art. On the contrary, the compound of the present invention reacts with diazo-compounds at a temperature of 140–170° C. without alkaline-producing compound and is stable at a room temperature (even if humidity is higher) to not react with diazo-compound. Furthermore, the dye image which has been provided by the reaction of diazo-compound, does not give discoloration and fading under ambient condition. The compounds of the present invention are best suited for the coupler of the diazo-type sensitive material.

DESCRIPTION OF THE PREFERRED EMBODIMENT

The following examples will serve to illustrate but not to limit the invention.

Example 1.—Preparation of methyl ester of 2,6-dihydroxy-3,5-dibromo-4-methoxybenzoic acid Methyl ester of 2,6-dihydroxy-4-methoxybenzoic acid (M.P. 114–115° C.), 3.96 g. (0.02 mol), which has been obtained (in a yield of 94% by the reaction of 2,4,6-trihydroxybenzoic acid with diazomethane in ether solution, is dissolved in 20 cc. of chloroform and 7.05 g. (0.044 mol) of bromine is dripped into the solution with stirring at a room temperature in the course of 10 minutes and then the reaction is continued for 1 hour. After the reaction has been completed, chloroform is removed by distillation and thus the crude product (M.P. 150–153° C.) having a light-brown color was obtained. After having been recrystallized from acetic acid, the crude product gave 6.21 g. of the pure product (i.e. the captioned compound having M.P. 154–155° C. and a white granular crystal form).

|  | Percent |
|---|---|
| Yield of the pure product | 87.2 |
| Found | 44.48 |
| Br (calculated for $C_9H_8O_5Br_2$) | 44.96 |

Said product provides a royal purple dye image by the reaction of 4-diazodialkylaniline.

Example 2.—Preparation of 2,6-dihydroxy-3-bromo-4-methoxy 5-chloro-benzoic acid 2,6-dihydroxy-4-methoxybenzoic acid, (M.P. 139° C. (dec.)), 18.4 g. (0.1 mol), which has been obtained by reacting phloroglucinmonomethylether with potassium bicarbonate under heating at 110–120° C. in an autoclave, is dissolved in 150 cc. of glacial acetic acid and 17.6 g. (0.11 mol) of bromine is dripped into the solution with vigorous stirring at a room temperature in the course of 30 minutes and then the reaction is continued for 3 hours. As the reaction proceeds, needle-like crystals separate. After the reaction has been completed, said solution is concentrated under reduced pressure and the crystals are separated by filtration. Thus, 18.2 g. of the intermediate product (2,6-dihydroxy-3-bromo-4-methoxybenzoic acid) having M.P. 187° C. (dec.) and a white needle crystal form was obtained. Then, 52.6 g. (0.02 mol) of said intermediate product is dissolved in 100 cc. of glacial acetic acid and 3.51 g. (0.026 mol) of sulfuryl chloride (calculated in 100%) is dripped into the solution at a room temperature in the course of about 10 minutes and the reaction is continued for 1 hour and then the reaction is carried out 1 hour more under heating the solution to 40–50° C. After the reaction has been completed, said solution is concentrated under reduced pressure and the crude product (M.P. 184° C. (dec.)) is obtained. After having been recrystallized from acetic acid, the crude product gave 4.18 g. of the pure product (M.P. 198° C. (dec.)) having a white needle-like crystal form.

Yield of the pure product: 68.8%.

Found (percent): C, 31.74; H, 2.03. Calcd. for $C_8H_{12}O_5BrCl$ (percent): C, 32.27; H, 2.30.

Said product provides a blue dye image by reacting with diazo-compounds.

Example 3.—Preparation of 2,6-dihydroxy-3,5-dibromo-4-ethoxybenzoic acid 2,6-dihydroxy-4-ethoxybenzoic acid (M.P. about 137° C. (dec.)) is obtained by the reaction of phloroglucinmonoethylether with potassium bicarbonate and water under heating at 110–120° C. in an autoclave. The product thus obtained, 3.96 g., gave 3.78 g. of the pure product (the captioned compound) having M.P. about 183° C. (dec.) and a white needle-like crystal form in the same procedure as that described in Example 1.

|  | Percent |
|---|---|
| Yield of the pure product | 53.2 |
| Found | 44.25 |
| Br (calcd. for $C_9H_8O_5Br_2$) | 44.96 |

We claim:
1. A compound of the formula:

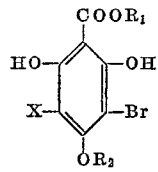

wherein $R_1$ is hydrogen or lower alkyl radical of from 1 to 4 carbon atoms, $R_2$ is lower alkyl radical of from 1 to 4 carbon atoms and X is bromine or chlorine.

2. A compound according to claim 1 which is the methyl ester of 2,6-dihydroxy-3,5-dibromo-4-methoxybenzoic acid.

3. A compound according to claim 1 which is 2,6-dihydroxy-3-bromo-4-methoxy-5-chloro-benzoic acid.

4. A compound according to claim 1 which is 2,6-dihydroxy-3,5-dibromo-4-methoxybenzoic acid.

References Cited

UNITED STATES PATENTS 3,331,869    7/1967    Krueger et al. _____ 260—521 A

OTHER REFERENCES

Fieser and Fieser: "Reagents for Organic Synthesis," John Wiley & Sons, 1129 (1967).

Grove et al.: J. Chem. Soc. 1956–63 (1956).

JAMES A. PATTEN, Primary Examiner

J. F. TERAPANE, Assistant Examiner

U.S. Cl. X.R.

8—2; 260—521 A